United States Patent [19]
Gogan

[11] Patent Number: 6,009,922
[45] Date of Patent: Jan. 4, 2000

[54] EMERGENCY VEHICLE TRACTION DEVICE

[76] Inventor: Tudor Gogan, 4904 - 147th Pl. SW., Edmonds, Wash. 98026

[21] Appl. No.: 09/089,850

[22] Filed: Jun. 3, 1998

[51] Int. Cl.[7] .................................................. B60C 27/00
[52] U.S. Cl. ........................................ 152/218; 152/232
[58] Field of Search ................................ 152/170, 178, 152/181, 185, 186, 190, 213 R, 217, 218, 219, 225 R, 226, 232, 233, 236, 237

[56] References Cited

U.S. PATENT DOCUMENTS

| | | | |
|---|---|---|---|
| 1,854,616 | 4/1932 | Lowe . | |
| 2,058,799 | 10/1936 | Jacks | 152/14 |
| 2,065,638 | 12/1936 | Blum | 152/232 X |
| 2,085,204 | 6/1937 | Sullivan | 152/14 |
| 2,222,891 | 11/1940 | Ransom | 152/237 X |
| 2,448,730 | 9/1948 | Paraskevas | 152/237 |
| 4,074,741 | 2/1978 | Moore et al. | 152/237 |
| 4,187,894 | 2/1980 | Peterson | 152/222 |
| 4,207,939 | 6/1980 | Motosko, II | 152/221 |
| 4,280,544 | 7/1981 | White | 152/221 |
| 4,287,925 | 9/1981 | Spann | 152/221 |
| 4,334,569 | 6/1982 | Jacob et al. | 152/221 |
| 4,368,769 | 1/1983 | Rooksian | 152/218 |
| 4,391,315 | 7/1983 | Jacobson | 152/213 |
| 4,825,923 | 5/1989 | Blankenship et al. | 152/213 |

*Primary Examiner*—Russell D. Stormer
*Attorney, Agent, or Firm*—Garrison & Associates PS; Matthew J. Marquardt; David L. Garrison

[57] ABSTRACT

An emergency vehicle traction device for improving the traction of an automobile wheel having laterally communicating hub apertures. The device comprises a traction member preferably comprising a chain for improvement of the wheel's traction, a flexible rope or strap for wrapping around the inside of the wheel and through a hub aperture, and a novel fastener member for holding the traction device in place on the wheel. The fastener member comprises one or more rope binding channels and one or more rope binder adapted to bind a free end of the rope member, and thereby to hold the traction device securely in place. A preferred embodiment of the traction device further comprises a retrieval tool adapted to pass through the hub aperture and to draw the free end of the rope through the wheel by engaging an eye provided on the free end of the rope. No more than two or three traction devices according to the disclosure are needed to move a vehicle out of even the worst predicaments. Traction devices according to the invention are easy and quick to install, and may easily be installed without lying on the ground in the mud, snow, or dirt.

7 Claims, 2 Drawing Sheets

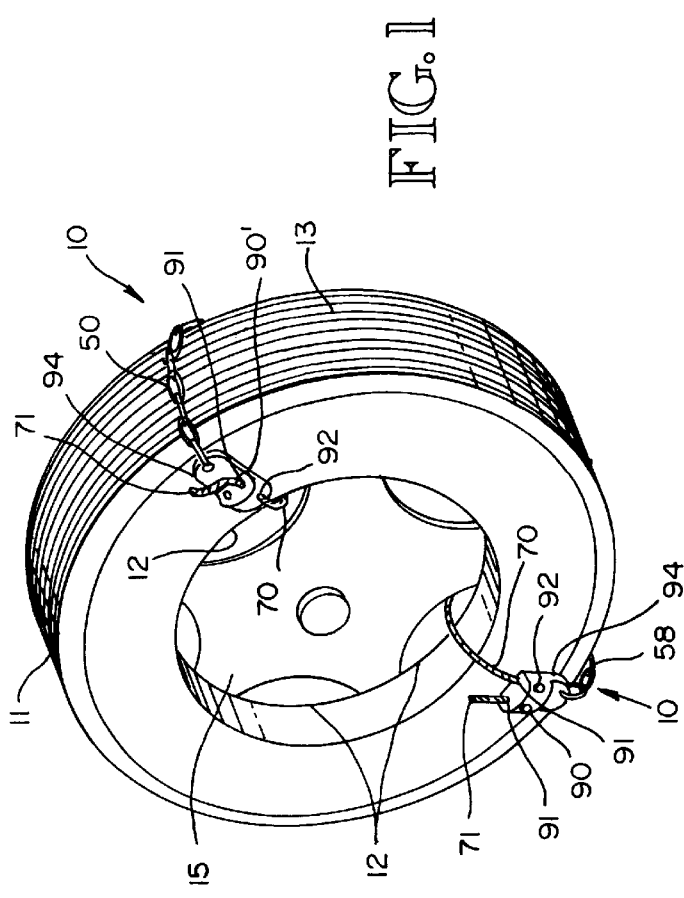
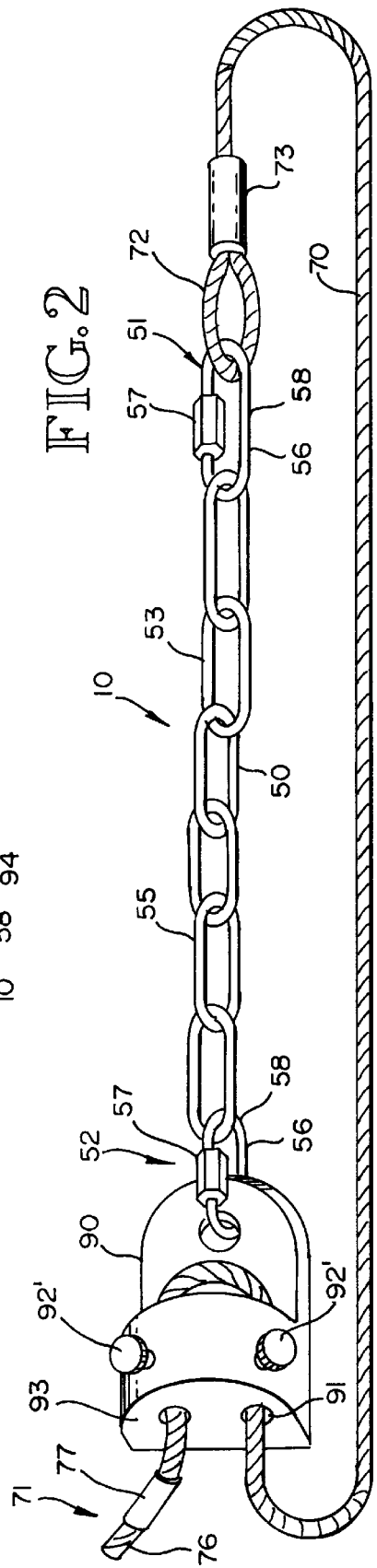

EMERGENCY VEHICLE TRACTION DEVICE

TECHNICAL FIELD

The invention relates to emergency automotive traction devices. More particularly, it relates to method and apparatus for providing improved traction to automobiles requiring temporary traction improvement in a wide variety of situations.

BACKGROUND OF THE INVENTION

It is not uncommon for automobiles to become bogged down or stuck on slippery or miring driving surfaces. For example, many autos become stuck in snow storms or on wet roads following heavy rains or floods. In addition to the inconvenience of being unable to complete one's journey, the stranding of vehicles in such fashion can impose considerable danger for the vehicle's occupants. For example, the extreme cold associated with blizzards and other snow storms, and the rising water levels associated with floods and heavy rains, can threaten life, safety, and health. In addition, the conditions that caused one automobile to become stuck can also detract from the control available to the drivers of other vehicles, so that merely remaining in or near an immobilized vehicle can involve an extreme danger of being struck by additional autos. A reasonable approach to extracting the vehicle and alleviating associated dangers and inconvenience is to improve the traction of the stranded vehicle through the installation of auxiliary traction devices on the tires or wheels of the automobile as it sits in place, so that the vehicle can be driven off to resume its journey.

Several means for the temporary enhancement of automobile tire traction are known. For example, tire chains and cables such as those shown in U.S. Pat. Nos. 4,391,315 to Jacobson and 4,825,923 to Blankenship et al. are well known. Devices of the type shown in those references suffer several disadvantages, however. For example, in addition to being cumbersome, difficult, and sometimes even dangerous to install, they also typically require, because they entirely encase the circumferential traction or bearing surface of the tire to which they are attached, that the vehicle be moved so that installation may be completed. Moreover, the installation process usually requires the installer to lie and/or kneel down on the ground—which, in the conditions in which such devices are typically installed, results in the installer besoiling him or herself, or getting him or herself wet, and therefore most usually cold, with associated risks to health, safety, and comfort. The relatively complex structure of such devices also drives production costs for the devices up, and increases the possibilities of failure when the devices are in use.

As a partial solution to the problems associated with the Jacobson, Blankenship, and similar devices, single-band wrap-around devices such as those shown in U.S. Pat. Nos. 5,454,412 to Bowers; 4,334,569 to Jacob et al.; 4,074,741 to Moore et al.; 2,085,204 to Sullivan; 2,058,799 to Jacks; and 1,854,616 to Lowe have been developed. While these devices represent some improvements, in that they are simpler and somewhat less prone to failure, potentially less expensive to produce, and do not necessarily require the vehicle to be moved for installation to be completed, they can still require the installer to lie or kneel down upon the cold, wet, or otherwise dirty or unpleasant ground—in order, for example, to fish the free end of the "wrap-around" devices through an aperture in the wheel hub to complete the connection. Moreover, in most cases the devices disclosed offer inadequate traction for the situations in which they might be called upon to be used; and they are generally impractical because the materials used and the connections provided are of inadequate strength for medium or heavy-duty use. For example, the plastic strap disclosed in Bowers U.S. Pat. No. 5,454,412 is of insufficient strength to allow a vehicle to remove itself from a slippery or muddy spot once the device has been installed. And the closure or attachment devices disclosed in the remaining cited references are insufficiently strong to retain the devices in place on the tires under the loads induced by extracting an automobile from a hole or a patch of ice or snow. Moreover, many of the devices disclosed are of materials and designs which are prone to stretching or other elongation, and fatal or detrimental to improved traction.

Thus there exists a need for an emergency vehicle traction device for providing improved traction to automobiles requiring temporary traction improvement in a wide variety of situations. In particular, there is a need for a device adapted for providing temporary, improved traction to an automobile stuck in mud, snow, ice, or other hazard, which is easy, quick, and convenient to install, and which is economical to produce and maintain. There is also a need for such a device which may be installed with no tools, or with common tools, and which will not cause damage to the wheel or vehicle to which it is attached.

DISCLOSURE OF THE INVENTION

Accordingly, it is an object of the invention to provide an emergency vehicle traction device for providing improved traction to automobiles requiring temporary traction improvement in a wide variety of situations. In particular, it is an object of the invention to provide a device adapted for providing temporary, improved traction to an automobile stuck in mud, snow, ice, or other hazard, which is easy, quick, and convenient to install, and which is economical to produce and maintain. It is also an object of the invention to provide such a device which may be installed with no tools, or with common tools, and which will not cause damage to or mar the finish of the wheel or vehicle to which it is attached.

The invention addresses and provides such a system. The invention provides an emergency vehicle traction device for improving the traction of an automobile wheel having laterally communicating hub apertures. The device comprises a traction member preferably comprising a chain for improvement of the wheel's traction, a flexible rope or strap for wrapping around the inside of the wheel and through a hub aperture, and a novel fastener member for restraining the rope or strap member and thus holding the traction device in place on the wheel. The fastener member comprises one or more rope or strap binding channels and one or more rope or strap binding means adapted to bind a free end of the rope member, and thereby to hold the traction device securely in place. A preferred embodiment of the traction device further comprises a retrieval tool adapted to pass through the hub aperture and to draw the free end of the rope through the wheel by engaging an eye provided on the free end of the rope. No more than two or three traction devices according to the disclosure are needed to move a vehicle out of even the worst predicaments. Traction devices according to the invention are easy and quick to install, and may easily be installed without lying on the ground in the mud, snow, or dirt.

In one aspect the invention provides an emergency vehicle traction device for improving the traction of an automobile wheel having one or more laterally communicating hub apertures and a traction or bearing surface such as the treaded portion of a tire, the traction surface being adapted for rolling contact with a driving surface. In general, the traction device of the invention comprises a traction member, a rope or strap member, and a fastener member. The traction member comprises a generally elongated member such as a chain, cable, or other device of relatively high strength having two ends and being capable, upon being interposed between an automobile wheel or tire and a driving surface, of enhancing traction between the wheel or tire and the driving surface. Thus typically the traction member comprises two ends and between them a traction enhancing section comprising an uninterrupted length of chain, cable, or other traction-enhancing material. The purpose of the traction enhancing member is to bear upon the driving surface and to increase the traction of the wheel to which it is attached. Preferred embodiments of the traction member comprise steel or other highly durable link chain, which is flexible, strong, corrosion resistant, convenient to store, and highly suitable for enhancing the traction of automotive wheels or tires as described herein.

The rope or strap member is generally flexible and is preferably directly attached to one end of the traction member, and indirectly attached to the other. The rope member serves to secure the traction member in place next to or across the traction or bearing surface (typically the treaded portion) of the wheel. In doing so it typically passes through an aperture in the wheel hub, such as an ornamental opening or the space between spokes or wheel posts. The second end of the rope member is left free for attachment to the fastener member of the traction device. Preferably the rope member is composed of such material that it will not scratch, mar, or otherwise damage the wheel, particularly any portions of the wheel comprising ornamental finishes, but which is strong enough to serve the purposes herein disclosed. Preferred embodiments of the rope member comprise nylon or other high-strength polymeric cord, or polymer- or elastomer-coated chain or cable, such as a vinyl-coated steel cable.

The fastener member is typically attached to the second end of the traction member, and serves to releaseably but securely restrain the free end of the rope member when the traction device is in place around the wheel. The fastener member comprises one or more rope or strap binding channels and one or more rope or strap binding means, the rope binding channels being adapted for receipt of the free end of the rope member and the binding means adapted for binding the free end within the channel(s). Preferred embodiments of the fastener member comprise a plurality of rope binding channels and a plurality of rope binding means, and most preferably two of each. In such embodiments the free end of the rope member is typically passed through a first binding channel, flexed, and passed through at least one of the remaining channel, thus providing a more secure attachment for the traction device than would generally be available from a single channel and binding means.

Thus by passing the free end of the rope member (a) through a laterally communicating aperture in the wheel hub of an automobile, around the bearing or traction surface of the wheel in such manner that a substantial portion of the traction section of the device is disposed across a substantial portion of the bearing surface, and (b) through the fastener member; in such manner as to interpose the traction member between bearing surface of the wheel and a driving surface when the wheel is rotated with respect to the driving surface, with the free end bound or otherwise secured by the fastener member, the traction of the wheel upon the driving surface may be improved.

In preferred embodiments of the traction device according to the invention the rope member further comprises, at its free end, an eye fashioned of wire, plastic, or other suitable material, adapted for engagement by a retrieval tool. In installing traction devices according to the invention, it occasionally happens that the free end of the rope member is found dangling on the inside of a wheel in a spot in which it is relatively difficult to retrieve and pull it through an aperture in the hub of the wheel. In such circumstances it is highly convenient to be able to insert a hook or other tool through the aperture, engage an eye in the free end of the rope member, and fish or pull it through the aperture so that it may be threaded into the fastener member. Thus in addition to the eye, preferred embodiments of the invention further comprise a retrieval tool adapted for passing through a hub aperture of an automobile wheel and for engagement of an eye in the free end of the rope member, whereby the free end may be drawn through the aperture and mounting of the traction device may be completed.

In another aspect the invention provides a fastener member for an emergency vehicle traction device of the type described. Such a fastener member is adapted for securing a traction device comprising a flexible rope member and a traction member, as described herein, and comprises at least one and preferably at least two rope binding channels and a corresponding number of rope binding means, the binding channels being adapted, as described, for the receipt of a free end of a flexible rope and the binding means adapted for binding the free end within the channels, such that the traction device may be securely attached to an automobile wheel for temporary enhancement of the automobile's traction.

Traction devices according to the invention offer a number of advantages, particularly when compared to previously-known devices. For example, they are easy to install, especially when provided with the hook and eye arrangements described for fishing the free end of the rope member through a hub aperture. Moreover, they may be installed without requiring the installer to lie down in the mud or snow or otherwise dirty, cold, wet, or unpleasant conditions in which an automobile has become stranded. Typically they may be installed in a matter of no more than 20 to 40 seconds, using common tools or no tools at all. They are removable and reusable, and have no required orientation for the traction section in order to function properly. They may be stored and transported easily, typically in an existing jack or spare tire compartment, where they are out of the way and take up no space needed for the storage or transportation of other items. They are very strong, and can accomplish the important purpose of moving a vehicle through a relatively short distance, with no more than two or three of them installed on a drive wheel. Being comprised in portions in contact with ornamental parts of the wheel of non-abrasive and non-marring materials, they may be used without damage to a vehicle. And in comparison with most prior art devices, they are extremely economical to make, use, maintain, and install.

BRIEF DESCRIPTION OF THE DRAWINGS

FIG. 1 is a schematic perspective view of preferred embodiments of emergency vehicle traction devices according to the invention, installed on an automobile wheel.

FIG. 2 is a schematic perspective view of a preferred embodiment of an emergency vehicle traction device according to the invention.

BEST MODE OF CARRYING OUT THE INVENTION

Figure 3:
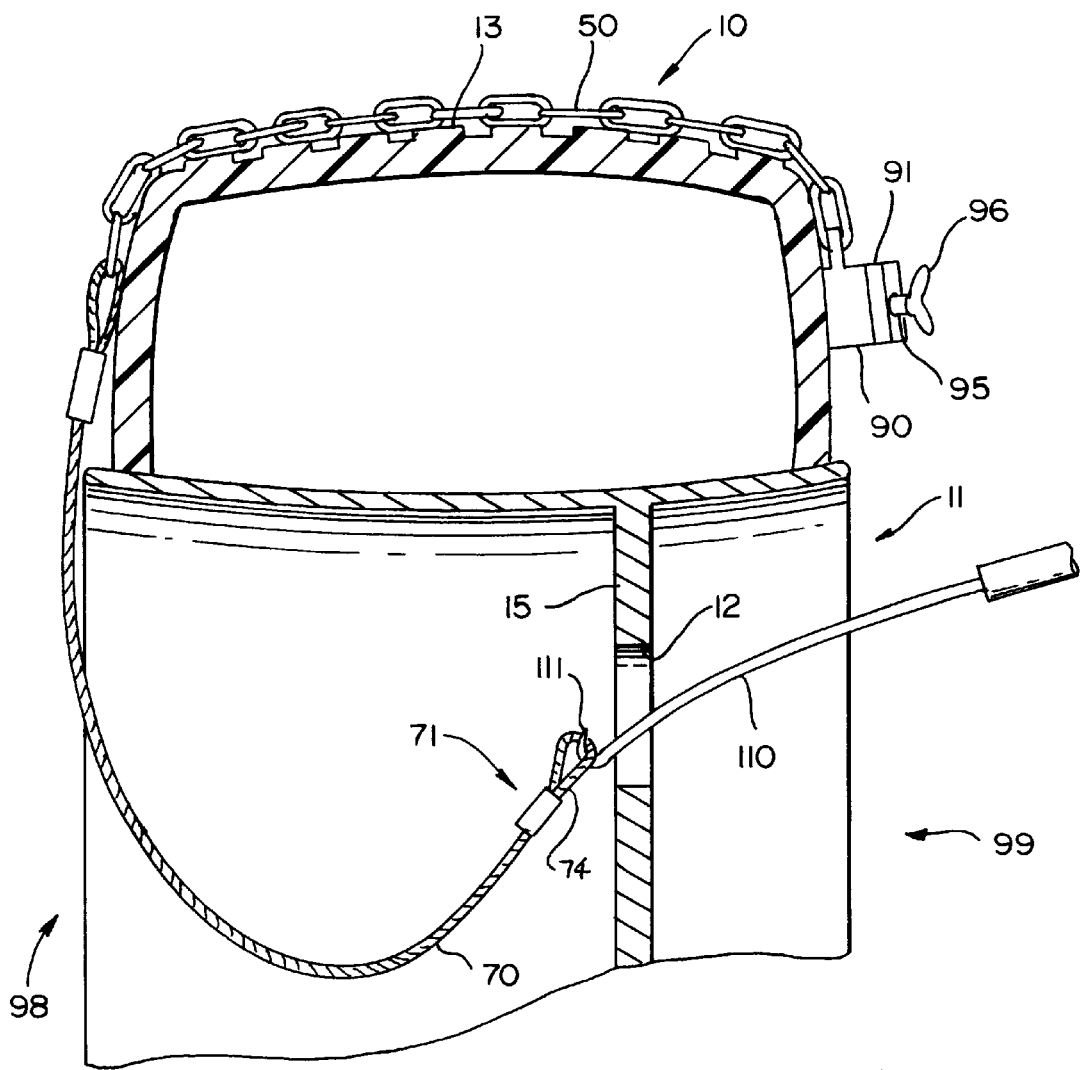
FIG. 3 is a schematic perspective view of a preferred embodiment of an emergency vehicle traction device according to the invention, being installed on an automobile wheel.

Automobile or vehicle, within the meaning of this disclosure, means any truck, car, van, or other vehicle adapted for wheeled motion along a driving surface. A driving surface is any surface suitable for the passage or support of a wheel or wheels of such a vehicle. Emergency, within the meaning of this disclosure, means any circumstance in which enhanced traction is required or beneficial.

The invention is adapted for use with any wheel, tire, or wheel, tire and/or hub combination comprising communicating apertures of sufficient size to accommodate the emergency traction device described herein.

Rope or strap means any line, cord, cable, or flexible means for resisting tension loads, and in particular lines and cords composed of twisted or braided strands of fibers, including natural or synthetic fibers, and in particular polymeric fibers such as nylon, natural fibers such as hemp, and metal or metallic fibers such as carbon or steel.

Turning now to the drawings, the invention will be described in a preferred embodiment by reference to the numerals of the drawing figures wherein like numbers indicate like parts.

FIG. 1 is a schematic perspective view of preferred embodiments of emergency vehicle traction devices according to the invention, installed on an automobile wheel 11 comprising tire 14, which includes tread, traction, or bearing surface 13, and hub or rim 15, which comprises laterally communicating apertures 12. Emergency traction devices 10 and 10' comprise traction members 50, rope members 70, and fastener members 90 and 90', respectively. Fastener member 90 comprises two rope binding channels 91 and two rope binding means 92; fastener member 90' comprises one of each. Traction members 50 are attached to the attachment means at optional lugs 94 and to rope members 70. Free ends 71 of the rope members are in place within rope binding channels 91 and stopped or bound in place within their respective channels by rope binding means 92, which are shown as machine screws, such that substantial portions of traction sections 50 are disposed across bearing surface 13 in such manner as to interpose the traction sections between the bearing surface and a driving surface. Thus when wheel 11 is rotated with respect to the driving surface traction of the wheel upon the driving surface is improved.

FIG. 2 is a schematic perspective view of a preferred embodiment of an emergency vehicle traction device according to the invention. Traction device 10 comprises fastener member 90, which is attached to traction member 50 at second end 52 of the traction member by means of optional lug 94 and removable link 56, and rope member 70, which is securely attached to first end 51 of the traction member by means of conventional loop 72 and binding collar 73 combination, and removable link 56. As may be seen, free end 71 of rope member 70 is of a length sufficient to pass around a tire/wheel as shown in FIG. 1, through first rope binding channel 91, and through second rope binding channel 93, whereupon, by tightening binding means 92 (again depicted as machine screws), the traction device may be firmly and securely held in place upon the wheel. Free end 71 further comprises line cap 77 and wire eye 76, which is attached to the rope member by any convenient means and which is adapted for engagement for a retrieval tool of the type described herein.

The use of removable links 56 facilitates convenient replacement of worn or broken parts (including in particular the traction member), disassembly, cleaning, and maintenance. Removable links may take a number of forms, many of which are well known and are readily available through regular commercial channels. A typical example comprises a semi-complete link having a threaded end, and a rotating fastener member having mating threads. The provision of removable links of the type herein contemplated will not trouble the ordinary designer of the types of equipment described.

FIG. 3 is a schematic perspective view of a preferred embodiment of an emergency vehicle traction device according to the invention, being installed on an automobile wheel. Traction device 10 has been draped over the top of a wheel 11, with fastener member 90 on an outer face 99 of the wheel ("outer" meaning on an accessible side, such as that away from the chassis of an automobile and visible from the exterior of the vehicle) and flexible rope member 70 hanging down against inner face 98 of the wheel (as for example inside an automobile wheel well). Traction member 50 is in place against bearing surface 13 of the wheel, in position to provide increased traction to the tire once the traction device has been secured. Free end 71 of the rope member comprises loop 74, which is adapted to be engaged by hook 111 of retrieval tool 10, which has been inserted through hub aperture 12 for the purpose. Upon engagement of loop 74 by retrieval tool 110, free end 71 of the rope member may be pulled or "fished" through the aperture for insertion in rope binding channel 91 on fastener member 90. Retrieval tool 110 is shown in a hook configuration, but may take the form of spring-biased clamps (such as forceps) or other means for grasping free end 71.

The fastener member of the traction device according to the invention, by virtue of its rope binding channel and rope binding means, provides a much stronger, more secure grip than those found on prior art devices. Moreover, it is extremely simple and rapid to secure. Preferred embodiments of the fastener member comprise at least one and most preferably two rope binding channels (the strength of the attachment being disproportionally increased by bending the free end of the rope back and passing it through a second channel as shown in FIGS. 1 and 2), with at least one rope binding means per channel. With the use of generally more elastic or slippery rope members or attachment materials, however, it may be advantageous to employ three or more rope binding channels. It is also advantageous, where extremely high traction requirements are likely to be encountered, to provide one or more of the rope binding channels with a plurality of rope binding means. The essence of the rope or strap binding channels and rope or strap binding means is that they facilitate the retention of the rope or strap member. Typically they accomplish this by holding the rope or strap in place within the channel, which may comprise either an open channel and/or a bore, and restraining the rope or strap by means of the treaded binding means, which drives against the rope or strap and holds it firmly by means of compression and friction within the binding channel.

Preferred rope binding means comprise machine screws or other threaded devices adapted to bear down upon the rope member when it is in place inside the rope binding channel. A wide variety of binding means may be employed; generally the binding means comprises a threaded shank (such as shank 95 in FIG. 3) and a head adapted for convenient tightening. For example, straight-slot or Philips head machine screws, Allen-head, hex-head, or other bolts, or wing-bolts (as shown at reference 96 in FIG. 3) will serve. A generally preferred binding means comprises a knob atop the threaded shank, by means of which the binding means may be driven by use of the fingers, without the need for additional tools. Such a knobbed binding means is shown at reference 92' in FIG. 3. It is generally preferable that knobbed binding means such as binding means 92' in FIG. 3 in fastener member embodiments comprising two or more binding means be offset from the parallel by an offset angle 97 of between approximately 10° and 90°, in order to facilitate turning of the knobs without interference from each other. In embodiments of the invention comprising other binding means, it is contemplated that the invention will generally be distributed with convenient means for engaging the binding member. For example, the invention may be sold or produced with appropriate Allen keys, screw drivers, spanners, or other driving devices. In particular, it has been found to be convenient to provide the binding means with a driving device attached to the traction device proximate the fastener member by a rubber strip, as is commonly done with drill chucks, or by means of a wire, etc. Thus the driving device is readily available when the traction device is installed, and the possibility of losing the key and the requirement for digging about in a dark, wet, cold trunk or other storage place are eliminated.

Preferred embodiments of the fastener member and the binding means according to the invention are made of forged, molded, formed, or machined metal, high-strength plastic, or similar material. In particular, molded bronze or bronze alloys are preferred. Steel is generally preferred also, although any material of sufficient strength, durability, toughness, and corrosion resistance to serve the purposes described herein will suffice.

The traction member comprises a chain, cable, or other traction enhancing device. Typically the traction member works by providing relatively rigid, strong structures capable of concentrating the relatively distributed load of the bearing surface of the wheel in such fashion that traction between the wheel and the driving surface is greatly enhanced. For example, concentrating a substantial portion of the load of an automobile tire on a chain on a snowy or icy driving surface will cause the chain to dig or "bite" into the surface, thus giving the wheel an improved grip or traction on the driving surface. Preferred traction members according to the invention are made of steel or other high-strength metal, although any metal, plastic, or other material of sufficient strength, durability, toughness, flexibility, and corrosion resistance to serve the purposes described herein will suffice.

The rope member according to the invention preferably comprises a metal or polymeric cord, attached to the traction member by means of loop—and—binding collar attachments sch as those shown in the figures, which are well known in the art of cord attachment, or of any material of sufficient strength, durability, toughness, flexibility, and corrosion resistance to serve the purposes described herein. Preferred rope members are coated with vinyl, other polymers, or other materials of sufficient softness or non-abrasiveness to allow the use of the invention with fancy or ornamental wheels or hubs, without damage to the wheel.

An optional feature of preferred rope members according to the invention is a eye or similar adaptation proximate the free end of the rope member to accommodate the reception of a retrieval tool. For example, free end 71 of rope member 70 in FIG. 3 comprises loop 74 and collar 75, which are sized to permit engagement and retrieval of the free end by retrieval tool 110, which has been inserted through aperture 12 to pull free end 71 through hub 15 for completion of installation of the traction device. Loop 74 and collar 75 are also sized to pass conveniently through binding channel 91 in fastener member 90 without sacrificing the security of the traction device once it has been installed.

Proper sizing of the various components of the invention described herein will depend upon the application to which the traction device they constitute is to be put. The selection of suitable gauges for traction members, rope members, and fastener members, and the appropriate sizing and clearance for the rope binding channels and rope binding means, will be well within the skill of the ordinary designer of automobile traction devices, once he or she has been armed with the disclosure herein.

EXAMPLE—Emergency Vehicle Traction Device for Passenger Auto

An emergency vehicle traction device for a passenger auto comprises a traction member, a rope member, and a fastener member. The traction member comprises drop-forged zinc-plated or polymer coated steel chain approximately 14" long, having links of ³⁄₁₆" gauge and approximately 1 and ⅜" length each. The traction member is attached at one end to a flexible rope member 30" long and comprising either a ¼" steel cable comprised of woven steel wires or a three strand woven nylon cord ½" in diameter (with ¼" strands). The rope member is attached to the traction member by means of a loop and collar, as shown in the Figures. (Alternatively, it might be woven back into itself, for increased strength.) The fastener member is comprised of a machined steel plate comprising an attachment hole for the traction member by means of a connecting link and two rope binding channels of ⅝" diameter. Each rope binding channel comprises a plug comprising a ⅝" threaded shank, a flat tip (for bearing on the rope member when the rope member is trapped within the binding channel), and a knobbed end for tightening the binding means without tools.

The resultant traction enhancement device is sized and adapted for use with a medium to large passenger automobile, such as a full-size, long-bed pickup truck, a fully-loaded sports utility vehicle, or a luxury passenger car, and capable of providing enough traction to allow the vehicle to be driven out of snow a foot or more deep, or on ice. The device will allow the vehicle to be moved when only one or two of the devices are installed on the drive wheel.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

INDUSTRIAL APPLICABILITY

The invention relates to the emergency automotive traction device field, and provides method and apparatus for temporary improved traction in cars, trucks, and other wheeled vehicles requiring temporary traction improvement in snow, ice, or other situations.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. An emergency vehicle traction device for improving the traction of an automobile wheel comprising a laterally communicating hub aperture and a bearing surface adapted for rolling contact with a driving surface, the traction device comprising:

a traction member comprising a first end, a second end, and a traction enhancing section therebetween;

a flexible rope member attached to said first end of the traction member, the flexible rope comprising a free end; and a fastener member attached to the second end of said traction member, the fastener member comprising a plurality of rope binding channels and a plurality of rope binding means adapted for binding said free end of said flexible rope within said channels when said free end is passed through a first binding channel, flexed, and passed through at least one additional binding channel;

whereby, upon passing said free end of said flexible rope member around a bearing surface of the wheel in such manner that a substantial portion of said traction section is disposed across a substantial portion of said bearing surface, through a laterally communicating aperture in a wheel hub of an automobile wheel, and through said fastener member, in such manner as to interpose said traction section between said bearing surface and a driving surface, when said wheel is rotated with respect to the driving surface with said free end bound by said fastener member, traction of said wheel upon said driving surface may be improved.

2. The apparatus of claim 1, wherein said traction enhancement section comprises a link chain.

3. The apparatus of claim 1, wherein said flexible rope member comprises a polymeric cord.

4. The apparatus of claim 1, wherein said flexible rope member comprises a coated rope chosen from the group comprising cables and chains.

5. The apparatus of claim 1, wherein said free end of said flexible rope member further comprises an eye adapted for reception of a retrieval tool.

6. The apparatus of claim 5, further comprising a retrieval tool adapted for passing through a hub aperture of said automobile wheel and for engagement of said eye, whereby said free end may be drawn through said aperture for mounting of the traction device.

7. A fastener member for an emergency vehicle traction device comprising a flexible rope member, said fastener member comprising a plurality of rope binding channels and a plurality of rope binding means adapted for binding a free end of a flexible rope within said channels when said free end is passed through a first of said binding channels, flexed, and passed through at least one additional binding channel;

whereby said traction device may be attached to an automobile wheel.

* * * * *